(12) United States Patent
Kawasaki et al.

(10) Patent No.: US 9,627,687 B2
(45) Date of Patent: *Apr. 18, 2017

(54) SECONDARY BATTERY

(75) Inventors: Daisuke Kawasaki, Minato-ku (JP);
Shinako Kaneko, Sagamihara (JP);
Jiro Iriyama, Minato-ku (JP)

(73) Assignees: NEC ENERGY DEVICES, LTD.,
Sagamihara-shi, Kanagawa (JP); NEC CORPORATION, Tokyo (JP)

( * ) Notice: Subject to any disclaimer, the term of this patent is extended or adjusted under 35 U.S.C. 154(b) by 239 days.

This patent is subject to a terminal disclaimer.

(21) Appl. No.: 13/498,799

(22) PCT Filed: Sep. 29, 2010

(86) PCT No.: PCT/JP2010/066922
§ 371 (c)(1),
(2), (4) Date: Mar. 28, 2012

(87) PCT Pub. No.: WO2011/040447
PCT Pub. Date: Apr. 7, 2011

(65) Prior Publication Data
US 2012/0183843 A1 Jul. 19, 2012

(30) Foreign Application Priority Data

Sep. 29, 2009 (JP) .................................. 2009-224545
Sep. 2, 2010 (JP) .................................. 2010-196631

(51) Int. Cl.
*H01M 4/587* (2010.01)
*H01M 4/36* (2006.01)
(Continued)

(52) U.S. Cl.
CPC ........... *H01M 4/587* (2013.01); *H01M 4/364* (2013.01); *H01M 4/38* (2013.01); *H01M 4/483* (2013.01);
(Continued)

(58) Field of Classification Search
CPC ...... H01M 4/364; H01M 4/622; H01M 6/183; H01M 4/38; H01M 4/483; H01M 4/587;
(Continued)

(56) References Cited

U.S. PATENT DOCUMENTS 6,924,061 B1 8/2005 Jow et al.
2003/0180618 A1 9/2003 Inoue et al.
(Continued)

FOREIGN PATENT DOCUMENTS

JP 06-325765 A 11/1994
JP 2001-283903 A 10/2001
(Continued)

OTHER PUBLICATIONS

Office Action, dated Dec. 23, 2013, issued by the State Intellectual Property Office of the People's Republic of China, in counterpart Application No. 201080043641.5.
(Continued)

*Primary Examiner* — Stephen Yanchuk
(74) *Attorney, Agent, or Firm* — Sughrue Mion, PLLC (57) ABSTRACT

An exemplary embodiment provides a lithium ion secondary battery using a high energy type anode, which enables long-life operation thereof. A secondary battery according to an exemplary embodiment comprises an electrode element in which a cathode and an anode are oppositely disposed, an electrolytic solution, and an outer packaging body which encloses the electrode element and the electrolytic solution inside; wherein the anode is formed by binding an anode active material, which comprises carbon material (a) that can absorb and desorb a lithium ion, metal (b) that can be alloyed with lithium, and metal oxide (c) that can absorb and desorb a lithium ion, to an anode collector with an anode binder; and wherein the electrolytic solution comprises a liquid
(Continued)

medium which is hard to generate carbon dioxide at a concentration of 10 to 80 vol %.

3 Claims, 1 Drawing Sheet

(51) Int. Cl.
  H01M 4/38      (2006.01)
  H01M 4/48      (2010.01)
  H01M 4/62      (2006.01)
  H01M 10/0525   (2010.01)
  H01M 10/0569   (2010.01)

(52) U.S. Cl.
  CPC ....... H01M 4/621 (2013.01); H01M 10/0525 (2013.01); H01M 10/0569 (2013.01); *Y02T 10/7011* (2013.01)

(58) Field of Classification Search
  CPC ............. H01M 4/621; H01M 10/0525; H01M 10/0569; Y02T 10/7011; Y02E 60/122
  USPC ........................................... 429/332
  See application file for complete search history.

(56) References Cited

U.S. PATENT DOCUMENTS

2003/0215711 A1* 11/2003 Aramata et al. ........... 429/218.1
2006/0172201 A1   8/2006  Yasukawa et al.
2010/0075225 A1*  3/2010  Wilkins et al. ............ 429/212
2010/0310943 A1* 12/2010  Koh et al. .................. 429/332
2011/0250503 A1* 10/2011  Wilson et al. .............. 429/307
2012/0148917 A1*  6/2012  Kobayashi et al. ......... 429/211

FOREIGN PATENT DOCUMENTS

| JP | 2003-123740 A |   | 4/2003 |
| JP | 2003-234127 A |   | 8/2003 |
| JP | 2003-282055 A |   | 10/2003 |
| JP | 2004-022433 A |   | 1/2004 |
| JP | 2004-047404 A |   | 2/2004 |
| JP | 2007-095670 A |   | 4/2007 |
| JP | 3982230 B2    |   | 9/2007 |
| JP | 2007-258067 A |   | 10/2007 |
| JP | 2008-021560 A |   | 1/2008 |
| JP | 2008-153117 A |   | 7/2008 |
| WO | 2008/007734 A1 |  | 1/2008 |
| WO | 2008/115168 A2 |  | 9/2008 |
| WO | WO-2011-024799 | * | 3/2011 |

OTHER PUBLICATIONS

Communication dated Mar. 20, 2014, issued by the European Patent Office in corresponding Application No. 10820562.6.

Imhof et al., "Oxidative Electrolyte Solvent Degradation in Lithium-Ion Batteries: An In Situ Differential Electrochemical Mass Spectrometry Investigation", Journal of the Electrochemical Society, 1999, vol. 146, Issue 5, pp. 1702-1706.

* cited by examiner

SECONDARY BATTERY

CROSS REFERENCE TO RELATED APPLICATIONS

This application is a National Stage of International Application No. PCT/JP2010/066922 filed Sep. 29, 2010, claiming priority based on Japanese Patent Application Nos. 2009-224545 filed Sep. 29, 2009and 2010-196631 filed Sep. 2, 2010, the contents of all of which are incorporated herein by reference in their entirety.

TECHNICAL FIELD

An exemplary aspect of the invention relates to a secondary battery, and particularly to a lithium ion secondary battery.

BACKGROUND ART

With rapid market expansion of laptop computers, mobile phones, electric vehicles, and the like, a secondary battery having a high energy density is required. Examples of a method for obtaining a secondary battery having a high energy density include a method in which an anode material having large capacity is used, and a method in which a nonaqueous electrolytic solution having a superior stability is used.

Patent document 1 discloses using silicon oxide or a silicate as an anode active material of a secondary battery. Patent document 2 discloses an anode for a secondary battery which has an active material layer containing a particle of carbon material that can absorb and desorb a lithium ion, a metal particle that can be alloyed with lithium, and an oxide particle that can absorb and desorb a lithium ion. Patent documents 3 discloses an anode material for a secondary battery which is formed by coating a surface of a particle, which has a structure in which silicon fine crystal is dispersed in a silicon compound, with carbon.

Patent document 4 discloses a nonaqueous electrolytic solution which contains a fluorine-containing phosphoric acid ester having the following structure:

In the formula, $Rf^1$, $Rf^2$ and $Rf^3$ are identical or different and are each a fluorine-containing alkyl group having a carbon number of 1 to 3.

Patent document 5 and Patent document 6 disclose using a polyimide as an anode binder when an anode active material contains silicon.

PRIOR ART DOCUMENT

Patent Document

Patent document 1: JP 06-325765 A
Patent document 2: JP 2003-123740 A
Patent document 3: JP 2004-47404 A
Patent document 4: JP 2008-21560 A
Patent document 5: JP 2004-22433 A
Patent document 6: JP 2007-95670 A

SUMMARY OF THE INVENTION

Problem to be Solved by the Invention

However, when charging and discharging are carried out at 45° C. or higher in the case where the silicon oxide described in Patent document 1 is used as an anode active material, there has been a problem in which capacity deterioration which is associated with a charge/discharge cycle is significantly large. The anode for a secondary battery described in Patent document 2 has an effect in which volume change of the anode as a whole is relaxed due to the different charge/discharge electric potentials among three kinds of components when a lithium ion is absorbed and desorbed. However, in Patent document 2, there have been many points which are not sufficiently studied, such as a point regarding a relationship among three kinds of components in a state of coexistence, and points regarding a binder, an electrolytic solution, an electrode element structure, and an outer packaging body which are indispensable for a formation of a lithium ion secondary battery. The anode material for a secondary battery described in Patent document 3 also has an effect in which volume expansion of the anode as a whole is relaxed. However, in Patent document 3, there have been many points which are not sufficiently studied, such as points regarding a binder, an electrolytic solution, an electrode element structure, and an outer packaging body which are indispensable for a formation of a lithium ion secondary battery.

The nonaqueous electrolytic solution described in Patent document 4 is used to utilize noncombustibility or oxidation resistivity thereof, but has never been used to effectively suppress generation of carbon dioxide which is associated with reductive decomposition of a nonaqueous electrolytic solution. Also, in Patent document 4, there have been many points which are not sufficiently studied, such as points regarding an anode active material, an electrode element structure, and an outer packaging body which are indispensable for a formation of a lithium ion secondary battery.

In Patent documents 5 and 6, a study regarding a state of an anode active material is insufficient, and additionally there have been many points which are not sufficiently studied, such as points regarding an anode active material, an electrode element structure, and an outer packaging body which are indispensable for a formation of a lithium ion secondary battery.

Thus, an exemplary aspect of the invention is intended to provide a lithium ion secondary battery using a high energy type anode, which enables long-life operation thereof.

Means for Solving the Problem

An exemplary aspect of the invention is a secondary battery, comprising an electrode element in which a cathode and an anode are oppositely disposed, an electrolytic solution, and an outer packaging body which encloses the electrode element and the electrolytic solution inside;

wherein the anode is formed by binding an anode active material, which comprises carbon material (a) that can absorb and desorb a lithium ion, metal (b) that can be alloyed with lithium, and metal oxide (c) that can absorb and desorb a lithium ion, to an anode collector with an anode binder; and wherein the electrolytic solution comprises a liquid medium which is hard to generate carbon dioxide at a concentration of 10 to 80 vol %.

Effect of the Invention

According to an exemplary aspect of the invention, a lithium ion secondary battery using a high energy type anode, which enables long-life operation thereof, can be provided.

MODE FOR CARRYING OUT THE INVENTION

As follows, an exemplary embodiment of the invention is described in detail.

In a secondary battery according to an exemplary embodiment of the invention, an electrode element in which a cathode and an anode are oppositely disposed and an electrolytic solution are enclosed inside an outer packaging body. As for the shape of the secondary battery, cylindrical type, flattened spiral square type, stacked square type, coin type, flattened spiral laminate type, and stacked laminate type can be used, but stacked laminate type is preferable. As follows, a stacked laminate type secondary battery is described.

Figure 1:
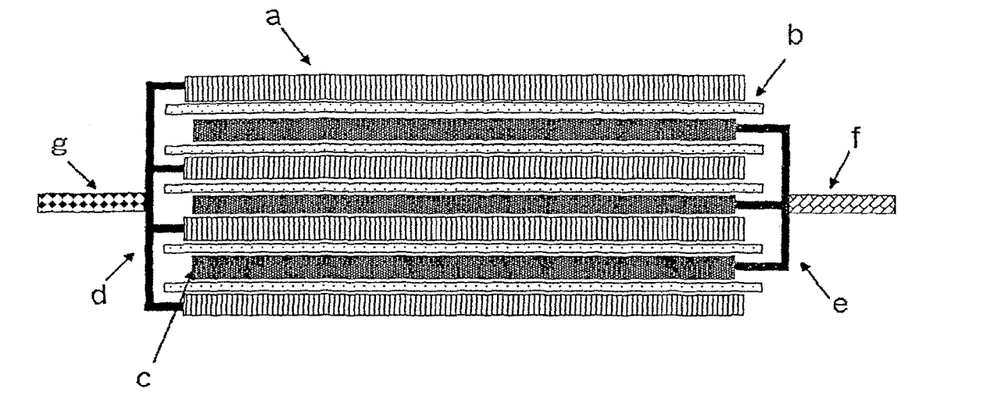
FIG. 1 is a schematic sectional view showing a structure of an electrode element in a stacked laminate type secondary battery.

FIG. 1 is a schematic sectional view showing a structure of an electrode element in a stacked laminate type secondary battery. This electrode element is formed by alternately stacking a plurality of cathodes c and a plurality of anodes a with separators b placed therebetween. Cathode collectors e in each cathodes c are electrically connected by being welded one another at the end parts thereof which are not covered with a cathode active material, and further a cathode terminal f is welded to the welded part. Anode collectors d in each anodes a are electrically connected by being welded one another at the end parts thereof which are not covered with an anode active material, and further an anode terminal g is welded to the welded part.

There is an advantage in the electrode element having such a planar stacking structure such that it is hardly affected by volume change of the electrode which is associated with charging and discharging, in comparison with the electrode element having a spiral structure because there is no part having small R (such as area near spiral center of the spiral structure). That is, the electrode element is useful when an active material which easily generates volume expansion is used. On the other hand, the electrode is bent in the electrode element having a spiral structure, which results in distortion of the structure due to generation of volume change. In particular, in the case of using an anode active material such as a silicon oxide which generates large volume change associated with charging and discharging, large capacity deterioration which is associated with charging and discharging occurs in a secondary battery using an electrode element having a spiral structure.

However, the electrode element having a planar stacking structure has a problem that a gas which is generated between the electrodes easily accumulates between the electrodes. This is because, in the case of the electrode element having a stacking structure, it is easy to extend the space between the electrodes, while, in the case of the electrode element having a spiral structure, the electrodes are tensioned therebetween and thereby the space between the electrodes is hard to be extended. In the case where the outer packaging body is an aluminum lamination film, this problem becomes particularly significant.

An exemplary embodiment of the invention can solve the above-mentioned problem, and can provide a lithium ion secondary battery using a high energy type anode, which enables long-life operation thereof.

[1] Anode

An anode is formed by binding an anode active material on an anode collector with an anode binder so that the anode active material covers the anode collector. In an exemplary embodiment of the invention, carbon material (a) that can absorb and desorb a lithium ion, metal (b) that can be alloyed with lithium, and metal oxide (c) that can absorb and desorb a lithium ion are used.

As carbon material (a), graphite, amorphous carbon, diamond-like carbon, carbon nanotube or a complex thereof may be used. Here, graphite which has high crystallinity has a high electroconductivity and has a superior adhesiveness with a cathode collector made of copper or the like as well as a superior voltage flatness. On the other hand, amorphous carbon which has low crystallinity has a relatively low volume expansion. Therefore, there is a high effect of relaxing volume expansion and deterioration due to ununiformity such as crystal grain boundary or defect is hard to occur.

As metal (b), Al, Si, Pb, Sn, In, Bi, Ag, Ba, Ca, Hg, Pd, Pt, Te, Zn, La or an alloy of two or more kinds thereof can be used. Particularly, it is preferable to contain silicon (Si) as metal (b).

As metal oxide (c), silicon oxide, aluminum oxide, tin oxide, indium oxide, zinc oxide, lithium oxide or a complex thereof can be used. Particularly, it is preferable to contain silicon oxide as metal oxide (c). This is because silicon oxide is relatively stable and is hard to cause a reaction with another chemical compound. Also, metal oxide (c) is preferably an oxide of a metal which constitutes metal (b). Also, one kind or two or more kinds of element selected from nitrogen, boron and sulfur can be added to metal oxide (c), for example, in an amount of 0.1 to 5 mass %. In this way, electroconductivity of metal oxide (c) can be improved.

As for metal oxide (c), all or a part thereof preferably has an amorphous structure. Metal oxide (c) having an amorphous structure can suppress volume expansion of carbon material (a) or metal (b) that is another anode active material and can also suppress decomposition of an electrolytic solution containing a phosphoric acid ester compound. This mechanism is not obvious, but the amorphous structure of metal oxide (c) is presumed to have some influence on a coating formation at an interface between carbon material (a) and an electrolytic solution. Also, the amorphous structure has relatively small amount of influence due to ununiformity such as crystal grain boundary or defect. Note that, it can be confirmed by X-ray diffraction measurement (common XRD measurement) that all or a part of metal oxide (c) has an amorphous structure. Specifically, in the case where metal oxide (c) does not have an amorphous structure, a peak peculiar to metal oxide (c) is observed, while in the case where all or a part of metal oxide (c) has an amorphous structure, a peak peculiar to metal oxide (c) that is observed comes to be broad.

Also, as for metal (b), all or a part thereof is preferably dispersed in metal oxide (c). Dispersing at least a part of metal (b) in metal oxide (c) can suppress volume expansion of the anode as a whole and can also suppress decomposition of an electrolytic solution. Note that, it can be confirmed by transmission electron microscope observation (general TEM observation) in combination with energy dispersive X-ray spectroscopy measurement (general EDX measurement) that all or a part of metal (b) is dispersed in metal oxide (c). Specifically, a section of a specimen of metal particle (b) is observed and an oxygen atom concentration of metal particle (b) which is dispersing in metal oxide (c) is measured, and thereby it can be confirmed that a metal which constitutes metal particle (b) does not become an oxide.

An anode active material containing carbon material (a), metal (b) and metal oxide (c), in which all or a part of metal oxide (c) has an amorphous structure and in which all or a part of metal (b) is dispersed in metal oxide (c), can be produced for example by a method disclosed in Patent document 3. That is, CVD processing of metal oxide (c) is performed under an atmosphere containing an organic substance gas such as methane gas, to obtain a complex in which metal (b) in metal oxide (c) is a nanocluster, and in which the surface is covered with carbon material (a). Also, the above-mentioned anode active material is also produced by mixing carbon material (a), metal (b) and metal oxide (c) by mechanical milling.

There is no limitation for the ratios of carbon material (a), metal (b) and metal oxide (c) in particular. The ratio of carbon material (a) is preferably 2 mass % or more and 50 mass % or less with respect to the total amount of carbon material (a), metal (b) and metal oxide (c), and is preferably 2 mass % or more and 30 mass % or less. The ratio of metal (b) is preferably 5 mass % or more and 90 mass % or less with respect to the total amount of carbon material (a), metal (b) and metal oxide (c), and is preferably 20 mass % or more and 50 mass % or less. The ratio of metal oxide (c) is preferably 5 mass % or more and 90 mass % or less with respect to the total amount of carbon material (a), metal (b) and metal oxide (c), and is preferably 40 mass % or more and 70 mass % or less.

Also, each of carbon material (a), metal (b) and metal oxide (c) used may be, but should not be particularly limited to, a particle thereof For example, the average particle diameter of metal (b) can be constituted in a range smaller than the average particle diameter of carbon material (a) and the average particle diameter of metal oxide (c). From this constitution, since metal (b) in which volume change which is associated with charge and discharge is small has a relatively small particle diameter, and since carbon material (a) and metal oxide (c) in which volume change is large have a relatively large particle diameter, dendrite generation and pulverization of alloy are more effectively suppressed. Also, in the process of charge and discharge, a lithium ion is absorbed and desorbed from the larger diameter particle, the smaller diameter particle and the larger diameter particle in this order. From this point, residual stress and residual strain are suppressed. The average particle diameter of metal (b) is, for example, 20 μm or less, and is preferably 15 μm or less.

Also, it is preferable that the average particle diameter of metal oxide (c) is a half or less of the average particle diameter of carbon material (a), and it is preferable that the average particle diameter of metal (b) is a half or less of the average particle diameter of metal oxide (c). It is even more particularly preferable that the average particle diameter of metal oxide (c) is a half or less of the average particle diameter of carbon material (a) as well as that the average particle diameter of metal (b) is a half or less of the average particle diameter of metal oxide (c). Controlling the average particle diameter in this range can more effectively give a relaxation effect of the volume expansion of metal and alloy phase, and can provide a secondary battery having superior balance of energy density, cycle life and efficiency. More specifically, it is preferable that the average particle diameter of silicon oxide (c) is a half or less of the average particle diameter of graphite (a) and that the average particle diameter of silicon (b) is a half or less of the average particle diameter of silicon oxide (c). Also, more specifically, the average particle diameter of silicon (b) is, for example, 20 μm or less, and is preferably 15 μm or less.

As an anode binder, a polyvinylidene fluoride, a vinylidene fluoride-hexafluoropropylene copolymer, a vinylidene fluoride-tetrafluoroethylene copolymer, a styrene-butadiene copolymerized rubber, a polytetrafluoroethylene, a polypropylene, a polyethylene, a polyimide, a polyamide-imide or the like may be used. Among them, from the viewpoint of strong binding property, a polyimide or a polyamide-imide is preferable. The amount of the anode binder used is preferably 5 to 25 parts by mass with respect to 100 parts by mass of the anode active material from the viewpoint of "sufficient binding force" and "high energy" which are in trade-off relationship to each other.

As an anode collector, aluminum, nickel, copper, silver and alloying thereof are preferable from the viewpoint of electrochemical stability. Examples of the shape thereof include foil, flat plate and mesh.

An anode can be produced by forming an anode active material layer containing an anode active material and an anode binder on an anode collector. Examples of the method for forming the anode active material layer include doctor blade method, die coater method, CVD method, and sputtering method. An anode active material layer is first formed, and a thin film of aluminum, nickel or an alloy thereof is thereafter foamed by vapor deposition, sputtering or the like to form an anode collector.

[2] Cathode

A cathode is formed for example by binding a cathode active material on a cathode collector with a cathode binder so that the cathode active material covers the cathode collector.

Examples of the cathode active material include lithium manganates having a layered structure or lithium manganates having a Spinel structure including $LiMnO_2$ and $Li_xMn_2O_4$ (0<x<2); $LiCoO_2$, $LiNiO_2$ and materials in which a part of transition metal thereof are substituted with another metal; lithium transition metal oxides such as $LiNi_{1/3}Co_{1/3}Mn_{1/3}O_2$ in which the molar ratio of a particular transition metal is not more than a half; and materials which have lithium at a larger amount than the stoichiometric amount in these lithium transition metal oxides. Particularly, $Li_\alpha Ni_\beta Co_\gamma Al_\delta O_2$ (1≤α≤1.2, β+γ+δ=1, β≥0.7, and γ≤0.2) or $Li_\alpha Ni_\beta Co_\gamma Mn_\delta O_2$ (1≤α≤1.2, β+γ+δ=1, β≥0.6, and γ≤0.2) is preferable. The cathode active material can be used alone, or in combination with two or more kinds.

As a cathode binder, a material for a cathode binder or the like may be used. Among them, from the viewpoint of versatility and low cost, a polyvinylidene fluoride is preferable. The amount of the cathode binder used is preferably 2 to 10 parts by mass with respect to 100 parts by mass of the cathode active material, from the standpoint of "sufficient binding force" and "high energy" which are trade-off to each other.

As a cathode collector, a material for an anode collector or the like can be used.

For the purpose of reducing impedance, an electroconductive auxiliary material may be added to a cathode active material layer containing a cathode active material. Examples of the electroconductive auxiliary material include carbonaceous fine particles such as graphite, carbon black, and acetylene black.

[3] Electrolytic Solution

An electrolytic solution used in an exemplary embodiment of the invention contains a liquid medium which is hard to generate carbon dioxide at a concentration of 10 to 80 vol %. The concentration of the liquid medium which is hard to generate carbon dioxide in the electrolytic solution is more preferably 40 to 80 vol %, and is most preferably 50 to 70 vol %.

Note that, the liquid medium which is hard to generate carbon dioxide is definitely distinguished from liquid media which generate carbon dioxide by a general combustion reaction and is characterized by being hard to generate carbon dioxide by electrolysis. Particularly, it is characterized by being hard to generate carbon dioxide by reductive decomposition. Thus, it means a liquid medium such as a liquid medium which does not have a carbonate group (—$CO_3$— group) or —COO— group in the molecular structure, which has a carbon atom in the molecular structure and an oxygen atom double-bonded to the carbon atom, but which the molar ratio of the oxygen atom adjacent to the carbon atom is not set to be 1:2 or more.

Examples of the liquid medium which is hard to generate carbon dioxide include chain ether compounds such as 1,2-diethoxyethane (DEE), ethoxymethoxyethane (EME), dimethyl ether, methyl ethyl ether, diethyl ether, methyl propyl ether, ethyl propyl ether, dipropyl ether, methyl butyl ether, ethyl butyl ether, propyl butyl ether, and a fluorinated ether compound in which a part of hydrogen atoms of these are substituted by fluorine atom(s); cyclic ether compounds such as tetrahydrofuran and 2-methyltetrahydrofuran; dimethylsulfoxide, 1,3-dioxolane, formamide, acetamide, dimethylformamide, 1,2-dioxolane, acetonitrile, propionitrile, nitromethane, ethyl monoglyme, phosphoric acid triesters, trimethoxy methane, dioxolane derivatives, sulfolane, methyl sulfolane, 1,3-dimethyl-2-imidazolidinone, 3-methyl-2-oxazolidinone, tetrahydrofuran derivatives, 1,3-propane sultone, anisole, N-methylpyrrolidone, ionic liquids, liquid phosphazenes. The liquid medium which is hard to generate carbon dioxide can be used alone, or in combination with two or more kinds.

A liquid medium which is hard to generate carbon dioxide preferably has no —COO— group which is easy to generate carbon dioxide. Particularly, a liquid medium which is hard to generate carbon dioxide is more preferably a phosphoric acid ester compound which has a good compatibility with another nonaqueous electrolytic solution, and is further preferably a fluorinated phosphoric acid ester compound which has a good stability. However, a non-fluorinated phosphoric acid ester compound may be used as a phosphoric acid ester compound.

A fluorinated phosphoric acid ester compound is preferably a compound represented by following formula (1):

(1)

In formula (1), x, y and z are each independently 0, 1 or 2, and l, m and n are each independently an integer of 0 to 3, and a, b and c are each independently an integer of 0 to 3. However, x×l, y×m, z×n, a, b and c are not all together set to be 0.

It is more preferably a compound represented by following formula (2):

$O=P(OCH_2CF_3)_3$ (2).

Note that, 1 to 3 out of three ester structures in the above-mentioned fluorinated phosphoric acid ester compound may be a non-fluorinated phenyl ester structure or a non-fluorinated phenyl ester structure.

A non-fluorinated phosphoric acid ester is preferably a compound represented by following formula (3):

(3)

In formula (3), p, q and r are each independently an integer of 0 to 3.

Note that, 1 to 3 out of three ester structures in the above-mentioned non-fluorinated phosphoric acid ester compound may be a non-fluorinated phenyl ester structure.

Note that, in one embodiment, the liquid medium which is hard to generate carbon dioxide can be a medium which does not contain a chain ether compound. A chain ether compound may be a non-fluorinated chain ether compound or a fluorinated chain ether compound in which a part of hydrogen atoms of a non-fluorinated chain ether compound are substituted by fluorine atom(s).

Examples of the non-fluorinated chain ether compound include non-fluorinated chain monoether compounds such as dimethyl ether, methyl ethyl ether, diethyl ether, methyl propyl ether, ethyl propyl ether, dipropyl ether, methyl butyl ether, ethyl butyl ether, propyl butyl ether, dibutyl ether, methyl pentyl ether, ethyl pentyl ether, propyl pentyl ether, butyl pentyl ether, and dipentyl ether; and non-fluorinated chain diether compounds such as 1,2-dimethoxyethane (DME), 1,2-diethoxyethane (DEE), ethoxymethoxyethane (EME), 1,2-dipropoxy ethane, propoxyethoxyethane, propoxymethoxyethane, 1,2-dibutoxyethane, butoxypropoxyethane, butoxyethoxyethane, butoxymethoxyethane, 1,2-dipentoxyethane, pentoxybutoxyethane, pentoxypropoxyethane, pentoxyethoxyethane, and pentoxymethoxyethane.

A fluorinated chain ether compound may be a compound represented by following formula (A):

(A).

In formula (A), n is 1, 2, 3 or 4, and $X^1$ to $X^8$ are each independently a fluorine atom or a hydrogen atom. However, at least one of $X^1$ to $X^4$ is a fluorine atom, and at least one of $X^5$ to $X^8$ is a fluorine atom. Also, as for the atom ratio of the fluorine atom and the hydrogen atom which are bonded to the compound of formula (A), [(the total number of the fluorine atom)/(the total number of the hydrogen atom)]≥1. It may also be following formula (B):

(B).

In formula (B), n is 1 or 2.

Also, in one embodiment, the liquid medium which is hard to generate carbon dioxide can be a medium which does not contain a cyclic ether compound. A cyclic ether compound may be a non-fluorinated cyclic ether compound or a fluorinated cyclic ether compound in which a part of hydrogen atoms of a non-fluorinated cyclic ether compound are substituted by fluorine atom(s). Examples of the non-fluorinated cyclic ether compound include non-fluorinated cyclic monoether compounds such as ethylene oxide, propylene oxide, oxetane, tetrahydrofuran, 2-methyltetrahydrofuran, 3-methyltetrahydrofuran, tetrahydropyran, 2-methyltetrahydropyran, 3-methyltetrahydropyran, and 4-methyl tetrahydropyran; and non-fluorinated cyclic diether compounds such as 1,3-dioxolane, 2-methyl-1,3-dioxolane, 4-methyl-1,3-dioxolane, 1,4-dioxane, 2-methyl-1,4-dioxane, 1,3-dioxane, 2-methyl-1,3-dioxane, 4-methyl-1,3-dioxane, 5-methyl-1,3-dioxane, 2,4-dimethyl-1,3-dioxane, and 4-ethyl-1,3-dioxane.

An electrolytic solution used in an exemplary embodiment of the invention contains a nonaqueous electrolytic solution which is stable at an electric potential of battery operation, along with a liquid medium which is hard to generate carbon dioxide. Examples of the nonaqueous electrolytic solution include non-protic organic solvents, for example, cyclic carbonates such as propylene carbonate (PC), ethylene carbonate (EC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); propylene carbonate derivatives; and aliphatic carboxylic acid esters such as methyl formate, methyl acetate, and ethyl propionate. The nonaqueous electrolytic solution is preferably a cyclic or chain carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (MEC), or dipropyl carbonate (DPC). The nonaqueous electrolytic solution can be used alone, or in combination with two or more kinds.

An electrolytic solution used in an exemplary embodiment of the invention is formed by adding a supporting salt to a mixed liquid of a liquid medium which is hard to generate carbon dioxide and a nonaqueous electrolytic solution. Examples of the supporting salt include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, and $LiN(CF_3SO_2)_2$. The supporting salt can be used alone, or in combination with two or more kinds.

[4] Separator

As a separator, a porous film or a nonwoven cloth which is made of polypropylene or polyethylene can be used. A separator in which these are stacked can also be used.

[5] Outer Packaging Body

An outer packaging body is arbitrarily selected as long as it is stable against an electrolytic solution and it has a water vapor barrier property. For example, in the case of a stacked laminate type secondary battery, a lamination film of polypropylene, polyethylene, or the like which is coated with aluminum or silica is preferably used as an outer packaging body. Particularly, it is preferable to use an aluminum lamination film from the viewpoint of suppression of volume expansion.

In the case of a secondary battery in which a lamination film is used as an outer packaging body, when a gas is generated, distortion of the electrode element becomes much larger, than in the case of a secondary battery in which a metal can is used as an outer packaging body. This is because the lamination film is easily deformed by the inner pressure of the secondary battery in comparison with the metal can. Furthermore, in the case of the secondary battery in which a lamination film is used as an outer packaging body, the inner pressure of the battery is generally set to be lower than atmospheric pressure when it is sealed. Thus, the battery does not have extra space, which directly results in volume change of the battery and deformation of the electrode element.

However, a secondary battery according to an exemplary embodiment of the invention can overcome the above-mentioned problem. As a result, a stacked laminate type lithium ion secondary battery which is cheap and which is superior in design flexibility of the cell capacity by changing the number of lamination can be provided.

EXAMPLE

As follows, an exemplary embodiment of the invention is specifically described by Examples.

Example 1

Graphite having an average particle diameter of 30 μm as carbon material (a), silicon having an average particle diameter of 5 μm as metal (b), and amorphous silicon oxide ($SiO_x$, $0<x\leq2$) having an average particle diameter of 13 μm as metal oxide (c) silicon were weighed at a mass ratio of 5:35:60 and were mixed by so-called mechanical milling for 24 hours to obtain an anode active material. Note that, in this anode active material, silicon that is metal (b) was dispersed in silicon oxide ($SiO_x$, $0<x\leq2$) that is metal oxide (c).

The above-mentioned anode active material (average particle diameter D50=5 μm) and a polyimide (produced by UBE INDUSTRIES, trade name: U varnish A) as an anode binder were weighed at a mass ratio of 90:10 and they were mixed with n-methylpyrrolidone to form an anode slurry. The anode slurry was applied on copper foil having a thickness of 10 μm and was then dried, and it was further heat-treated under nitrogen atmosphere at 300° C. to produce an anode.

Lithium nickelate ($LiNi_{0.80}Co_{0.15}Al_{0.15}O_2$) as a cathode active material, carbon black as an electroconductive auxiliary material, and a polyvinylidene fluoride as a cathode binder were weighed at a mass ratio of 90:5:5 and they were mixed with n-methylpyrrolidone to form a cathode slurry. The cathode slurry was applied on aluminum foil having a thickness of 20 μm and was then dried, and it was further pressed to produce an anode.

The three layers of the cathode obtained and the four layers of the anode obtained were alternately stacked with a polypropylene porous film as a separator placed therebetween. End parts of the cathode collectors which were not covered with the cathode active material and of the anodes collectors which were not covered with the anode active material were respectively welded, and further an aluminum cathode terminal and a nickel anode terminal were respectively welded thereto, to obtain an electrode element which had a planar stacking structure.

On the other hand, a liquid medium which is hard to generate carbon dioxide and a carbonate type nonaqueous electrolytic solution was mixed at 60:40 (volume ratio), and $LiPF_6$ as a supporting salt was dissolved therein at a concentration of 1 mol/l to obtain a electrolytic solution. Note that, $O=P(OCH_2CF_3)_3$ was used as the liquid medium which is hard to generate carbon dioxide, and a mixed solvent of EC/PC/DMC/EMC/DEC=20/20/20/20/20 (volume ratio) was used as the carbonate type nonaqueous electrolytic solution.

The above-mentioned electrode element was embedded in an aluminum lamination film as an outer packaging body and the nonaqueous electrolytic solution was injected thereinto. After that, it was depressurized to 0.1 atm and was sealed to produce a secondary battery.

Example 2

This example was carried out in the same manner as in Example 1 except that the mixing ratio of the liquid medium which is hard to generate carbon dioxide to the carbonate type nonaqueous electrolytic solution was set to be 10:90 (volume ratio).

Example 3

This example was carried out in the same manner as in Example 1 except that the mixing ratio of the liquid medium which is hard to generate carbon dioxide to the carbonate type nonaqueous electrolytic solution was set to be 40:60 (volume ratio).

Example 4

This example was carried out in the same manner as in Example 1 except that the mixing ratio of the liquid medium which is hard to generate carbon dioxide to the carbonate type nonaqueous electrolytic solution was set to be 50:50 (volume ratio).

Example 5

This example was carried out in the same manner as in Example 1 except that the mixing ratio of the liquid medium which is hard to generate carbon dioxide to the carbonate type nonaqueous electrolytic solution was set to be 70:30 (volume ratio).

Example 6

This example was carried out in the same manner as in Example 1 except that the mixing ratio of the liquid medium which is hard to generate carbon dioxide to the carbonate type nonaqueous electrolytic solution was set to be 80:20 (volume ratio).

Comparative Example 1

This comparative example was carried out in the same manner as in Example 1 except that the liquid medium which is hard to generate carbon dioxide was not used.

Comparative Example 2

This comparative example was carried out in the same manner as in Example 1 except that the mixing ratio of the liquid medium which is hard to generate carbon dioxide to the carbonate type nonaqueous electrolytic solution was set to be 5:95 (volume ratio).

Comparative Example 3

This comparative example was carried out in the same manner as in Example 1 except that the carbonate type nonaqueous electrolytic solution was not used.

Example 7

This example was carried out in the same manner as in Example 1 except that $O=P(OCH_2CF_3)_2(OCH_2CH_3)$ was used as the liquid medium which is hard to generate carbon dioxide.

Example 8

This example was carried out in the same manner as in Example 1 except that $O=P(OCH_2CF_3)_2(OCH_2CH_2F)$ was used as the liquid medium which is hard to generate carbon dioxide.

Example 9

This example was carried out in the same manner as in Example 1 except that $O=P(OCH_2CF_3)_2(OCH_2CHF_2)$ was used as the liquid medium which is hard to generate carbon dioxide.

Example 10

This example was carried out in the same manner as in Example 1 except that $O=P(OCH_2CF_3)(OCH_2CH_3)_2$ was used as the liquid medium which is hard to generate carbon dioxide.

Example 11

This example was carried out in the same manner as in Example 1 except that $O=P(OCH_2CF_3)(OCH_2CH_3)(OCH_2CHF_2)$ was used as the liquid medium which is hard to generate carbon dioxide.

Example 12

This example was carried out in the same manner as in Example 1 except that $O=P(OCH2CF_3)(OCH_2CH_3)(OCH_2CH_2F)$ was used as the liquid medium which is hard to generate carbon dioxide.

Example 13

This example was carried out in the same manner as in Example 1 except that $O=P(OCH_2CF_3)(OCH_2CH_3)(OCHFCHF_2)$ was used as the liquid medium which is hard to generate carbon dioxide.

Example 14

This example was carried out in the same manner as in Example 1 except that $O=P(OCH_2CF_3)_2(OCH_2CF_3)$ was used as the liquid medium which is hard to generate carbon dioxide.

Example 15

This example was carried out in the same manner as in Example 1 except that $O=P(OCHFCF_3)(OCH_2CHF_2)(OCF_2CF_3)$ was used as the liquid medium which is hard to generate carbon dioxide.

Example 16

This example was carried out in the same manner as in Example 1 except that $O=P(OCF_2CF_3)_3$ was used as the liquid medium which is hard to generate carbon dioxide.

Example 17

This example was carried out in the same manner as in Example 1 except that $O=P(OCF_2CF_3)_2(OCH_2CHF_2)$ was used as the liquid medium which is hard to generate carbon dioxide.

Example 18

This example was carried out in the same manner as in Example 1 except that $O=P(OCH_2CH_2F)(OCH_2CH_3)_2$ was used as the liquid medium which is hard to generate carbon dioxide.

Example 19

This example was carried out in the same manner as in Example 1 except that $O=P(OCH_2CHF_2)(OCH_2CH_3)_2$ was used as the liquid medium which is hard to generate carbon dioxide.

Example 20

This example was carried out in the same manner as in Example 1 except that $O=P(OCHFCH_3)(OCH_2CH_3)_2$ was used as the liquid medium which is hard to generate carbon dioxide.

Example 21

This example was carried out in the same manner as in Example 1 except that $O=P(OCH_2CF_3)_2(OCH_2CH_2CF_3)$ was used as the liquid medium which is hard to generate carbon dioxide.

Example 22

This example was carried out in the same manner as in Example 1 except that $O=P(OCH_2CF_3)_2(OCH_2CF_2CF_3)$ was used as the liquid medium which is hard to generate carbon dioxide.

Example 23

This example was carried out in the same manner as in Example 1 except that $O=P(OCH_2CF_3)_2(OCF_2CF_2CF_3)$ was used as the liquid medium which is hard to generate carbon dioxide.

Example 24

This example was carried out in the same manner as in Example 1 except that $O=P(OCH_2CF_3)_2(OCH_2CH_2CH_3)$ was used as the liquid medium which is hard to generate carbon dioxide.

Example 25

This example was carried out in the same manner as in Example 1 except that $O=P(OCH_3)_3$ was used as the liquid medium which is hard to generate carbon dioxide.

Example 26

This example was carried out in the same manner as in Example 1 except that $O=P(OCF_3)_3$ was used as the liquid medium which is hard to generate carbon dioxide.

Example 27

This example was carried out in the same manner as in Example 1 except that $O=P(OCH_2CH_3)_3$ was used as the liquid medium which is hard to generate carbon dioxide.

Example 28

This example was carried out in the same manner as in Example 1 except that $O=P(OCH_2CH_2CH_3)_3$ was used as the liquid medium which is hard to generate carbon dioxide.

Example 29

This example was carried out in the same manner as in Example 1 except that $O=P(OCH_2CF_2CF_3)_3$ was used as the liquid medium which is hard to generate carbon dioxide.

Example 30

This example was carried out in the same manner as in Example 1 except that $O=P(OCH_2CH_2CH_2CH_2CH_2CH_2CH_2CH_3)_3$ was used as the liquid medium which is hard to generate carbon dioxide.

Example 31

This example was carried out in the same manner as in Example 1 except that $O=P(OCH_2CF_2CF_2CF_2CF_2CF_2CF_2CF_3)_3$ was used as the liquid medium which is hard to generate carbon dioxide.

Example 32

This example was carried out in the same manner as in Example 1 except that $O=P(OC_6H_5)_3$ was used as the liquid medium which is hard to generate carbon dioxide.

Example 33

This example was carried out in the same manner as in Example 1 except that $O=P(OC_6H_2F_3)_3$ (Note that, the position of the fluorine atoms in $OC_6H_2F_3$ is identical to 3,4,5-trifluorophenol.) was used as the liquid medium which is hard to generate carbon dioxide.

Example 34

This example was carried out in the same manner as in Example 1 except that $O=P(OCH_3)_2(OC_6H_5)$ was used as the liquid medium which is hard to generate carbon dioxide.

Example 35

This example was carried out in the same manner as in Example 1 except that $O=P(OCF_3)_2(OC_6H_5)$ was used as the liquid medium which is hard to generate carbon dioxide.

Example 36

This example was carried out in the same manner as in Example 1 except that $O=P(OCH_3)(OCH_2CH_3)(OC_6H_5)$ was used as the liquid medium which is hard to generate carbon dioxide.

Example 37

This example was carried out in the same manner as in Example 1 except that O=P(OCF$_3$)(OCH$_2$CF$_3$)(OC$_6$H$_5$) was used as the liquid medium which is hard to generate carbon dioxide.

Example 38

These examples were carried out in the same manner as in Example 1 except that a polyamide-imide (produced by TOYOBO CO., LTD., trade name: VYROMAX (registered trade mark) was used as the anode binder.

Example 39

Graphite having an average particle diameter of 30 μm as carbon material (a), silicon having an average particle diameter of 6 μm as metal (b), and crystalline silicon oxide (SiO$_2$) having an average particle diameter of 13 μm as metal oxide (c) silicon were weighed at a mass ratio of 5:35:60 and were mixed by so-called mechanical milling for 24 hours to obtain an anode active material. Note that, in this anode active material, silicon that is metal (b) was dispersed in crystalline silicon oxide that is metal oxide (c). And, this example was carried out in the same manner as in Example 1 except that this anode active material was used.

Example 40

Graphite having an average particle diameter of 30 μm as carbon material (a), silicon having an average particle diameter of 6 μm as metal (b), and amorphous silicon oxide (SiO$_x$, 0<x≤2) having an average particle diameter of 13 μm as metal oxide (c) silicon were weighed at a mass ratio of 5:35:60 and the mixed powder was to be an anode active material without any special treatment. Note that, in this anode active material, silicon that is metal (b) was not dispersed in amorphous silicon oxide that is metal oxide (c). And, this example was carried out in the same manner as in Example 1 except that this anode active material was used.

Example 41

An anode active material which contained carbon, silicon and amorphous silicon oxide (SiO$_x$, 0<x≤2) at a mass ratio of 5:35:60 was obtained by a method equivalent to that disclosed in Patent Document 3. Note that, in this anode active material, silicon that is metal (b) was dispersed in amorphous silicon oxide that is metal oxide (c). And, this example was carried out in the same manner as in Example 1 except that this anode active material was used.

Example 42

This example was carried out in the same manner as in Example 1 except that a polyvinylidene fluoride (produced by KUREHA CORPORATION, trade name: KF polymer #1300) was used as the anode binder.

<Evaluation>

Tests for the secondary batteries produced were conducted in which they were repeatedly charged and discharged within a voltage range of 2.5 V to 4.1 V in a thermostatic oven which was kept at a temperature of 60° C. The test results were shown in Table 1. Here, "C50/C5 (%)" in Table 1 means (discharged capacity at the 50$^{th}$ cycle)/(discharged capacity at the 5$^{th}$ cycle) (unit: %), which is a cycle retention ratio.

TABLE 1

| | liquid medium which is hard to generate carbon dioxide | | cycle retention ratio |
|---|---|---|---|
| | kind | content (vol %) | C50/C5 (%) |
| Ex. 1 | O=P(OCH$_2$CF$_3$)$_3$ | 60 | 85 |
| Ex. 2 | O=P(OCH$_2$CF$_3$)$_3$ | 10 | 50 |
| Ex. 3 | O=P(OCH$_2$CF$_3$)$_3$ | 40 | 60 |
| Ex. 4 | O=P(OCH$_2$CF$_3$)$_3$ | 50 | 80 |
| Ex. 5 | O=P(OCH$_2$CF$_3$)$_3$ | 70 | 80 |
| Ex. 6 | O=P(OCH$_2$CF$_3$)$_3$ | 80 | 60 |
| Comp. Ex. 1 | — | 0 | 11 |
| Comp. Ex. 2 | O=P(OCH$_2$CF$_3$)$_3$ | 5 | 18 |
| Comp. Ex. 3 | O=P(OCH$_2$CF$_3$)$_3$ | 100 | 50 |
| Ex. 7 | O=P(OCH$_2$CF$_3$)$_2$(OCH$_2$CH$_3$) | 60 | 75 |
| Ex. 8 | O=P(OCH$_2$CF$_3$)$_2$(OCH$_2$CH$_2$F) | 60 | 77 |
| Ex. 9 | O=P(OCH$_2$CF$_3$)$_2$(OCH$_2$CHF$_2$) | 60 | 74 |
| Ex. 10 | O=P(OCH$_2$CF$_3$)(OCH$_2$CH$_3$)$_2$ | 60 | 74 |
| Ex. 11 | O=P(OCH$_2$CF$_3$)(OCH$_2$CH$_3$)(OCH$_2$CHF$_2$) | 60 | 73 |
| Ex. 12 | O=P(OCH$_2$CF$_3$)(OCH$_2$CH$_3$)(OCH$_2$CH$_2$F) | 60 | 75 |
| Ex. 13 | O=P(OCH$_2$CF$_3$)(OCH$_2$CH$_3$)(OCHFCHF$_2$) | 60 | 79 |
| Ex. 14 | O=P(OCH$_2$CF$_3$)$_2$(OCF$_2$CF$_3$) | 60 | 80 |
| Ex. 15 | O=P(OCHFCF$_3$)(OCH$_2$CHF$_2$)(OCF$_2$CF$_3$) | 60 | 76 |
| Ex. 16 | O=P(OCF$_2$CF$_3$)$_3$ | 60 | 77 |
| Ex. 17 | O=P(OCF$_2$CF$_3$)$_2$(OCH$_2$CHF$_2$) | 60 | 75 |
| Ex. 18 | O=P(OCH$_2$CH$_2$F)(OCH$_2$CH$_3$)$_2$ | 60 | 64 |
| Ex. 19 | O=P(OCH$_2$CHF$_2$)(OCH$_2$CH$_3$)$_2$ | 60 | 66 |
| Ex. 20 | O=P(OCHFCH$_3$)(OCH$_2$CH$_3$)$_2$ | 60 | 65 |
| Ex. 21 | O=P(OCH$_2$CF$_3$)$_2$(OCH$_2$CH$_2$CF$_3$) | 60 | 68 |
| Ex. 22 | O=P(OCH$_2$CF$_3$)$_2$(OCH$_2$CF$_2$CF$_3$) | 60 | 69 |
| Ex. 23 | O=P(OCH$_2$CF$_3$)$_2$(OCF$_2$CF$_2$CF$_3$) | 60 | 70 |
| Ex. 24 | O=P(OCH$_2$CF$_3$)$_2$(OCH$_2$CH$_2$CH$_3$) | 60 | 69 |

TABLE 2

| | liquid medium which is hard to generate carbon dioxide | | cycle retention ratio |
|---|---|---|---|
| | kind | content (vol %) | C50/C5 (%) |
| Ex. 25 | O=P(OCH$_3$)$_3$ | 60 | 55 |
| Ex. 26 | O=P(OCF$_3$)$_3$ | 60 | 57 |
| Ex. 27 | O=P(OCH$_2$CH$_3$)$_3$ | 60 | 60 |
| Ex. 28 | O=P(OCH$_2$CH$_2$CH$_3$)$_3$ | 60 | 52 |
| Ex. 29 | O=P(OCH$_2$CF$_2$CF$_3$)$_3$ | 60 | 58 |
| Ex. 30 | O=P(OCH$_2$CH$_2$CH$_2$CH$_2$CH$_2$CH$_2$CH$_2$CH$_3$)$_3$ | 60 | 52 |
| Ex. 31 | O=P(OCH$_2$CF$_2$CF$_2$CF$_2$CF$_2$CF$_2$CF$_2$CF$_3$)$_3$ | 60 | 53 |
| Ex. 32 | O=P(OC$_6$H$_5$)$_3$ | 60 | 61 |
| Ex. 33 | O=P(OC$_6$H$_2$F$_3$)$_3$ | 60 | 64 |
| Ex. 34 | O=P(OCH$_3$)$_2$(OC$_6$H$_5$) | 60 | 62 |
| Ex. 35 | O=P(OCF$_3$)$_2$(OC$_6$H$_5$) | 60 | 65 |
| Ex. 36 | O=P(OCH$_3$)(OCH$_2$CH$_3$)(OC$_6$H$_5$) | 60 | 61 |
| Ex. 37 | O=P(OCF$_3$)(OCH$_2$CF$_3$)(OC$_6$H$_5$) | 60 | 66 |
| Ex. 38 | O=P(OCH$_2$CF$_3$)$_3$ | 60 | 85 |
| Ex. 39 | O=P(OCH$_2$CF$_3$)$_3$ | 60 | 60 |
| Ex. 40 | O=P(OCH$_2$CF$_3$)$_3$ | 60 | 50 |
| Ex. 41 | O=P(OCH$_2$CF$_3$)$_3$ | 60 | 88 |
| Ex. 42 | O=P(OCH$_2$CF$_3$)$_3$ | 60 | 45 |

As shown in Tables 1 and 2, the cycle retention ratios of the secondary batteries produced in Examples 1 to 42 were generally larger than the cycle retention ratios of secondary batteries produced in Comparative Examples 1 to 3. Note that, the cycle retention ratio of the secondary battery produced in Example 40 were comparable to the cycle retention ratio of secondary battery produced in Comparative Example 3, which may be because silicon in the anode active material was not dispersed in amorphous silicon oxide. Also, the cycle retention ratio of the secondary battery produced in Example 42 were smaller than the cycle retention ratio of secondary battery produced in Comparative Example 3, which may be because a polyvinylidene fluoride was used as the anode binder. It has been revealed from this result that capacity deterioration of the secondary battery which is associated with a charge/discharge cycle at 45° C. or higher can be improved by an exemplary embodiment of the invention even when the anode active material of the electrode element is a silicon oxide.

(Additional Statement)

Some or all of the above-mentioned embodiments can also be described as the following additional statements, but is not limited to the following.

(Additional Statement 1)

A secondary battery, comprising an electrode element in which a cathode and an anode are stacked, an electrolytic solution, and an outer packaging body which encloses the electrode element and the electrolytic solution inside;

wherein the anode is formed by binding an anode active material, which comprises carbon material (a) that can absorb and desorb a lithium ion, metal (b) that can be alloyed with lithium, and metal oxide (c) that can absorb and desorb a lithium ion, to an anode collector with an anode binder; and wherein the electrolytic solution comprises a liquid medium which is hard to generate carbon dioxide at a concentration of 10 to 80 vol %.

(Additional Statement 2)

The secondary battery according to Additional statement 1, wherein the liquid medium which is hard to generate carbon dioxide does not have a —COO— group.

(Additional Statement 3)

The secondary battery according to Additional statement 2, wherein the liquid medium which is hard to generate the carbon dioxide is a phosphoric acid ester compound.

(Additional Statement 4)

The secondary battery according to Additional statement 3, wherein the phosphoric acid ester compound is a fluorinated phosphoric acid ester compound.

(Additional Statement 5)

The secondary battery according to Additional statement 4, wherein the fluorinated phosphoric acid ester compound is represented by following formula (1):

In formula (1), x, y and z are each independently 0, 1 or 2, and l, m and n are each independently an integer of 0 to 3, and a, b and c are each independently an integer of 0 to 3. However, x×l, y×m, z×n, a, b and c are not all together set to be 0.

(Additional Statement 6)

The secondary battery according to Additional statement 5, wherein the fluorinated phosphoric acid ester compound is represented by following formula (2):

$$O=P(OCH_2CF_3)_3 \quad (2).$$

(Additional Statement 7)

The secondary battery according to Additional statement 3, wherein the phosphoric acid ester compound is a non-fluorinated phosphoric acid ester compound.

(Additional Statement 8)

The secondary battery according to Additional statement 7, wherein the non-fluorinated phosphoric acid ester compound is represented by following formula (3):

In formula (3), p, q and r are each independently an integer of 0 to 3.

(Additional Statement 9)

The secondary battery according to any one of Additional statements 1 to 8, wherein all or a part of metal oxide (c) has an amorphous structure.

(Additional Statement 10)

The secondary battery according to any one of Additional statements 1 to 9, wherein metal oxide (c) is an oxide of a metal which constitutes metal (b).

(Additional Statement 11)

The secondary battery according to any one of Additional statements 1 to 10, wherein all or a part of metal (b) is dispersed in metal oxide (c).

(Additional Statement 12)

The secondary battery according to any one of Additional statements 1 to 11, wherein metal (b) is silicon.

(Additional Statement 13)

The secondary battery according to any one of Additional statements 1 to 12, wherein the anode binder is a polyimide or polyimide-imide.

(Additional Statement 14)

The secondary battery according to any one of Additional statements 1 to 13, wherein the electrode element has a planar stacking structure.

(Additional Statement 15)

The secondary battery according to any one of Additional statements 1 to 14, wherein the outer packaging body is an aluminum lamination film.

The present application claims the priorities based on Japanese Patent Application No. 2009-224545, filed on Sep. 29, 2009, and Japanese Patent Application No. 2010-196631, filed on Sep. 2, 2010, all the disclosure of which is incorporated herein by reference.

INDUSTRIAL APPLICABILITY

An exemplary embodiment of the invention can be utilized in every industrial field in need of a power supply and in an industrial field concerning transportation, storage and supply of electrical energy. Specifically, it can be utilized, for examples, for a power supply of a mobile device such as a mobile phone and a laptop computer; a power supply of a moving or transport medium such as a train, a satellite and a submarine, and which includes an electric vehicle such as an electric car, a hybrid car, an electric motorcycle and an electric power-assisted bicycle; a back-up power supply such as UPS; and a power storage device of electric power which is generated by a solar power generation or a wind power generation.

EXPLANATION OF SYMBOL a anode
b separator
c cathode
d anode collector
e cathode collector
f cathode terminal
g anode terminal

What is claimed is:

1. A secondary battery, comprising an electrode element in which a cathode and an anode are oppositely disposed, an electrolytic solution, and an outer packaging body which encloses the electrode element and the electrolytic solution inside;

wherein the anode is formed by binding an anode active material, which comprises carbon material (a) that can absorb and desorb a lithium ion, metal (b) that can be alloyed with lithium, and metal oxide (c) that can absorb and desorb a lithium ion, to an anode collector with an anode binder;

wherein the electrolytic solution comprises a phosphoric acid ester compound at a concentration of 40 to 80 vol %, and the phosphoric acid ester is a fluorinated phosphoric acid ester compound that is represented by following formula (1):

wherein in formula (1), x, y and z are each independently 0, 1 or 2, and l, m and n are each independently an integer of 0 to 3, and a, b and c are each independently an integer of 0 to 3, with the proviso that x×l, y×m, z×n, a, b and c are not all together set to be 0;

wherein metal (b) is silicon, and metal oxide (c) is silicon oxide having wholly or partly an amorphous structure and all or part of metal (b) is dispersed in metal oxide (c); and wherein the anode binder comprises a polyimide or polyamide-imide.

2. The secondary battery according to claim 1, wherein the fluorinated phosphoric acid ester compound is represented by following formula (2):

3. The secondary battery according to claim 1, wherein the electrode element has a planar stacking structure.

* * * * *